United States Patent
James et al.

(10) Patent No.: US 7,694,595 B2
(45) Date of Patent: Apr. 13, 2010

(54) RESONATOR PARTICULARLY FOR A VIBRATING GYROSCOPE

(75) Inventors: Michel James, Clamart (FR); Alain Jeanroy, Conflans Sainte Honorine (FR)

(73) Assignee: Sagem Defense Securite, Paris (FR)

( * ) Notice: Subject to any disclaimer, the term of this patent is extended or adjusted under 35 U.S.C. 154(b) by 845 days.

(21) Appl. No.: 10/562,640

(22) PCT Filed: Jun. 28, 2004

(86) PCT No.: PCT/FR2004/001641

§ 371 (c)(1),
(2), (4) Date: Dec. 29, 2005

(87) PCT Pub. No.: WO2005/015128

PCT Pub. Date: Feb. 17, 2005

(65) Prior Publication Data

US 2006/0169068 A1    Aug. 3, 2006

(30) Foreign Application Priority Data

Jul. 10, 2003   (FR) .................................. 03 08465

(51) Int. Cl.
| | |
|---|---|
| G01C 19/16 | (2006.01) |
| G01C 19/20 | (2006.01) |
| G01C 19/38 | (2006.01) |
| G01C 19/54 | (2006.01) |
| B06B 3/00 | (2006.01) |

(52) U.S. Cl. .............................. 74/5 R; 74/5.4; 74/1 SS

(58) Field of Classification Search .................. 74/1 SS, 74/5 R, 86, 5.4; 73/504.13, 504.08; 482/44, 482/45, 110
See application file for complete search history.

(56) References Cited

U.S. PATENT DOCUMENTS

| | | | | |
|---|---|---|---|---|
| 4,150,580 | A * | 4/1979 | Silkebakken et al. | 74/5 R |
| 5,712,427 | A * | 1/1998 | Matthews | 73/504.04 |
| 6,474,161 | B1 * | 11/2002 | Jeanroy et al. | 73/504.13 |
| 6,942,605 | B1 * | 9/2005 | Sukhovitsky | 482/132 |
| 7,033,304 | B2 * | 4/2006 | Chuang et al. | 482/45 |
| 2003/0100408 | A1 * | 5/2003 | Chuang et al. | 482/44 |

FOREIGN PATENT DOCUMENTS

| | | |
|---|---|---|
| EP | 0 141 621 A | 5/1985 |
| FR | 2 063 128 A | 7/1971 |
| FR | 2 792 722 A | 10/2000 |
| FR | 2 805 039 A | 8/2001 |

* cited by examiner

*Primary Examiner*—Thomas R Hannon
*Assistant Examiner*—Justin Krause
(74) *Attorney, Agent, or Firm*—Muncy, Geissler, Olds & Lowe, PLLC

(57) ABSTRACT

The resonator comprises a shell 1 a having a pole 2 held by a support rod 3, the shell having an annular edge 4 defined by an inside surface 5 and an outside surface 6 that are geometrically similar and that extend around a common axis of revolution R, the inside surface and the outside surface being offset relative to each other along the axis of revolution in such a manner that the shell presents a thickness E along the annular edge 4 that is greater than the thickness e that it presents in the vicinity of the pole 2.

2 Claims, 1 Drawing Sheet

RESONATOR PARTICULARLY FOR A VIBRATING GYROSCOPE

The present invention relates to a resonator, in particular for implementing a gyro.

BACKGROUND OF THE INVENTION

A hemispherical resonant gyro generally comprises a hemispherical resonator of silica, comprising a shell with a pole held on a support rod, the shell including an annular edge defined by a hemispherical inside surface and a hemispherical outside surface that are concentric so that the shell presents constant thickness from the pole to the annular edge. The models for such surfaces are well known and they can therefore be machined with great precision. Nevertheless, a shell of constant thickness presents the drawback of having a modal mass, i.e. an effective mass, that is less than 20% of the total mass of the shell. This means that it is not possible to take full advantage of the very low damping of silica. Increasing the modal mass has the advantage of decreasing parasitic damping effects, in particular the damping that results from the metallization; of decreasing the relative effect of geometrical defects in machining; and of increasing the quantity of momentum of the vibration.

To increase modal mass, proposals have been made to increase the thickness of the shell while keeping it constant. Nevertheless, a uniform increase in shell thickness leads to an increase in resonant frequency in the same proportion as the increase in modal mass, such that the overall performance is not satisfactory.

Furthermore, for reasons that are independent of modal mass, proposals are made in document FR-A-2 792 772 to increase the thickness of the shell in the vicinity of its annular edge. It turns out that that configuration makes it possible to increase modal mass with little increase in the resonant frequency of the resonator. Nevertheless, in the above-specified document, the increase in the thickness of the shell along the edge is obtained by changing the shape of the inside and outside surfaces defining the shell, thus making the shell more complex to machine and increasing the risk of machining defects.

OBJECT OF THE INVENTION

An object of the invention is to propose a resonator having a modal mass that is greater than that of conventional resonators while conserving an operating frequency that is relatively low, and while conserving great ease in machining.

BRIEF DESCRIPTION OF THE INVENTION

In order to achieve this object, the invention provides a resonator comprising a shell a having a pole held by a support rod, the shell having an annular edge defined by an inside surface and an outside surface that are geometrically similar and that extend around a common axis of revolution, in which the inside surface and the outside surface are offset relative to each other along the axis of revolution in such a manner that the shell presents thickness along the annular edge that is greater than the thickness that it presents in the vicinity of the pole. Thus, since the difference in thickness between the edge of the shell and the pole is obtained merely by offsetting surfaces, machining models can be retained and it is therefore possible to make the shell without any particular difficulty in machining.

In an advantageous version of the invention, the inside surface and the outside surface are in the form of spherical caps. The difference in thickness between the edge and the pole is thus obtained merely by offsetting the centers of the spherical caps along the axis of revolution.

BRIEF DESCRIPTION OF THE DRAWING

Other characteristics and advantages of the invention appear on reading the following description of a particular and non-limiting embodiment of the invention given with reference to the sole accompanying FIGURE which is a view of the resonator of the invention in section on a vertical axial plane.

DETAILED DESCRIPTION OF THE INVENTION

Figure 1:
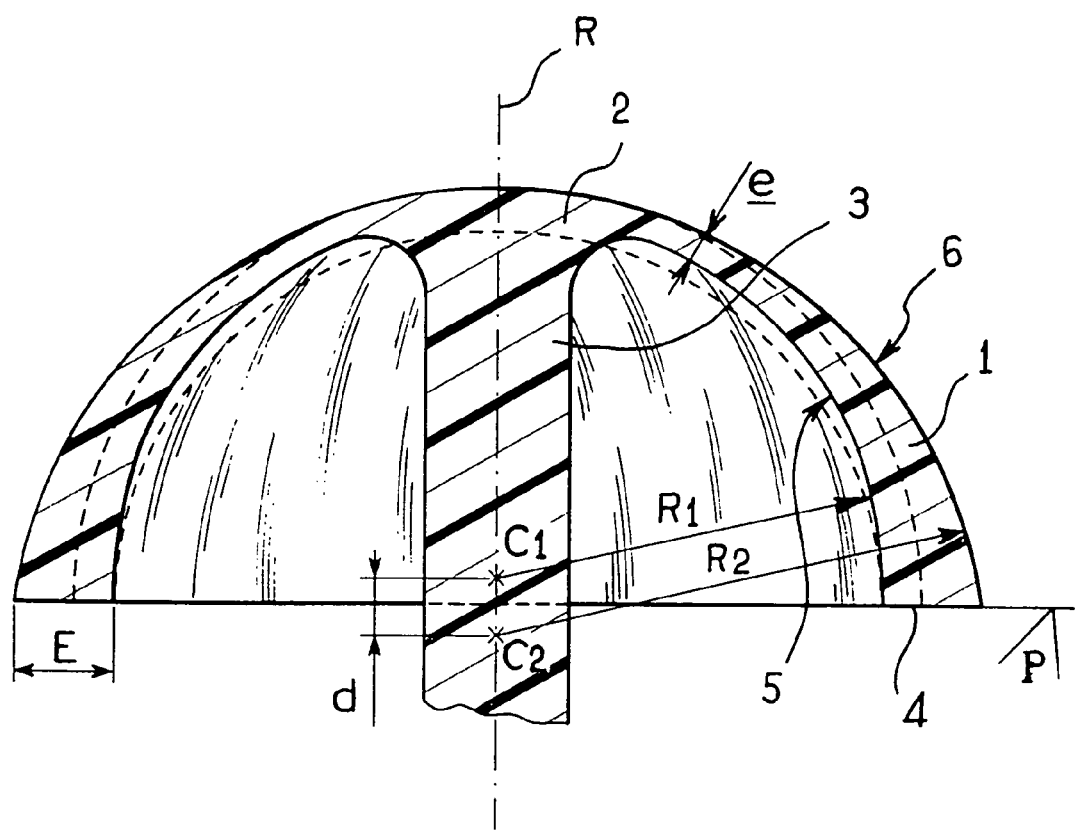

With reference to the FIGURE, which is much larger than life-size in order better to understand the invention, the resonator comprises in known manner a shell 1, which in the example shown is a substantially hemispherical shell, having a pole 2 held on a support rod 3. The shell 1 has an annular edge 4 defined by a plane P intersecting an inside surface 5 and an outside surface 6 perpendicularly to an axis of revolution R.

The dashed lines show the shape that is obtained when the inside surface 5 and the outside surface 6 are both hemispherical surfaces centered on the point of intersection between the axis of revolution R and the plane P containing the edge of the shell. Under such circumstances, the shell presents thickness that is constant and its modal mass is therefore low, as stated above.

In the embodiment shown of the invention, the inside surface 5 is in the form of a spherical cap whose center C1 is offset towards the inside of the shell relative to the plane P containing the edge of the shell. Furthermore, the outside surface 6 is also in the form of a spherical cap whose center C2 is offset towards the outside of the shell relative to the plane P. Because of these offsets, it can be seen that the thickness e of the shell in the vicinity of the pole is less than the usual thickness for the shell, while the thickness E along the edge 4 of the shell is greater than the usual thickness for the shell. By varying the distance d between the centers C1 and C2, and the respective radii R1 and R2 of the inside surface and of the outside surface 6, the desired variation in the thickness of the shell is obtained. By way of example, for a resonator having a diameter of 20 millimeters (mm) and a thickness of 0.7 mm, it is possible to make a shell that conserves a thickness of 0.7 mm in the vicinity of the pole and that has along its edge a thickness that is twice the thickness in the vicinity of the pole, thereby doubling the modal mass while increasing the resonant frequency of the resonator by only 30%. Because of the increase in the thickness of the shell along the edge 4, it is also possible to reduce the thickness of the layer of metallization (not shown) that is applied to the shell, thereby reducing the damping contributed by the metallization, while conserving the same electrical resistance for the metallization. In addition, the relative influence of machining defects is halved so that the operation of the resonator is improved.

Naturally, the invention is not restricted to the embodiment shown and variant embodiments can be provided without going beyond the ambit of the invention as defined by the claims. In particular, although the resonator of the invention is shown with an inside surface and an outside surface that are spherical, it is possible to make the resonator with other surfaces of revolution, in particular surfaces that are parabolic or elliptical, even through a surface that is spherical is easier to machine.

Although the invention is shown with an inside surface whose center C1 is offset towards the inside of the cap and an outside surface whose center C2 is offset towards the outside of the cap, it is possible to make the resonator of the invention using offsets that are different. The structure enabling the maximum modal mass to be obtained for given shell mass could consist in making the outside surface fixed in the form of a hemisphere whose center C2 is placed in the plane P, and in offsetting the center C1 of the inside surface 5 through the distance d towards the inside. Under such circumstances, the inside surface 5 occupies more than a hemisphere, such that the edge zone of the inside surface 5 is slightly reentrant. It could also be made cylindrical over a height d, by appropriate machining. In practice, the optimum compromise is obtained with spherical caps that are close to being hemispherical, the centers of the inside surface and of the outside surface being disposed on either side of the plane P containing the annular edge 4, as shown in the FIGURE.

The invention claimed is:

1. A resonator, comprising:
    a shell (1);
    said shell having a pole (2);
    said pole being held by a support rod (3);
    the shell (1) having an annular edge (4) defined by an inside surface (5) and an outside surface (6) that are substantially hemispheres and that extend around a common axis of revolution (R);
    wherein a center (C1) of the inside surface (5) and a center (C2) of the outside surface (6) are offset relative to each other along the axis of revolution (5) with a predetermined distance (d) between the centers (C1, C2); and
    wherein a radius (R1) of the inside surface (5) is different from a radius (R2) of the outside surface (6) in such a manner that the shell presents thickness (E) along the annular edge (4) that is greater than the thickness (e) that the shell presents in the vicinity of the pole.

2. A resonator according to claim 1, wherein the centers (C1, C2) of the inside surface and of the outside surface extend on either side of a plane (P) containing the annular edge (4).

* * * * *